W. H. JAMES.
SNOW PLOW.
APPLICATION FILED FEB. 17, 1913.
1,086,298. Patented Feb. 3, 1914.
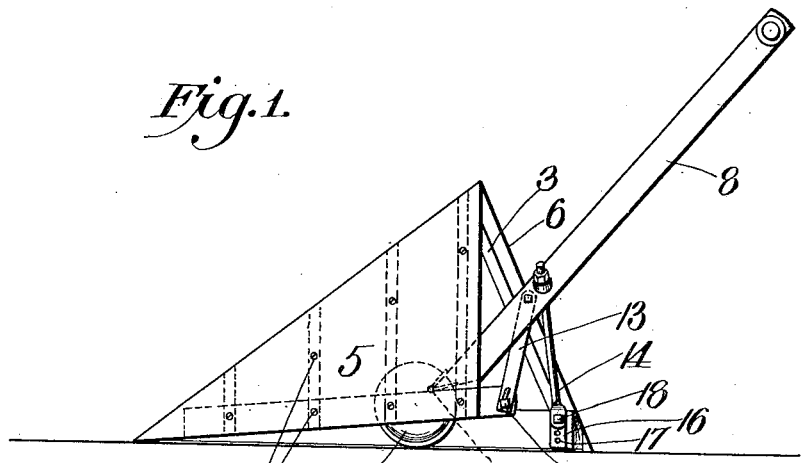
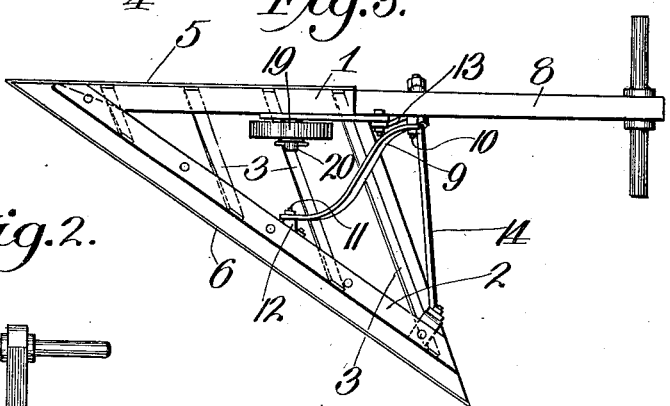
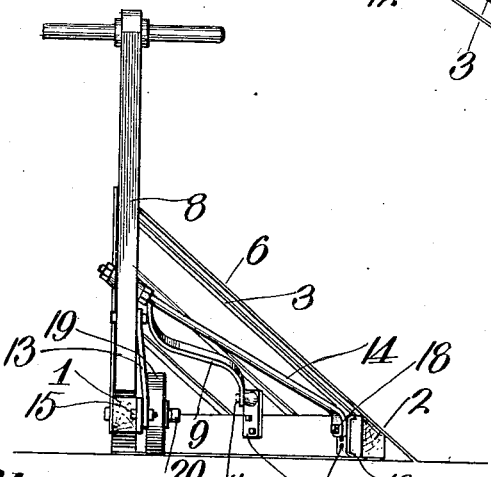
Witnesses
Frank R. Glora
Chas. W. Girard
Inventor
W. H. James
By George S. Thorpe Atty.

UNITED STATES PATENT OFFICE.

WILLIAM H. JAMES, OF KANSAS CITY, KANSAS, ASSIGNOR OF ONE-HALF TO M. E. BOOTH, OF KANSAS CITY, MISSOURI.

SNOW-PLOW.

1,086,298.   Specification of Letters Patent.   Patented Feb. 3, 1914.

Application filed February 17, 1913.   Serial No. 748,855.

*To all whom it may concern:*

Be it known that I, WILLIAM H. JAMES, a citizen of the United States, residing at Kansas City, in the county of Wyandotte and State of Kansas, have invented certain new and useful Improvements in Snow-Plows, of which the following is a specification.

This is an improvement in snow plows and my object is to produce a device of this kind which will be simple in construction so as not to get easily out of order and at the same time will be easy to operate and yet effective in its operation.

A further object is to make a device of this character which may be readily adjusted for the use of persons of different heights.

With these objects in view, the invention consists in the various features of construction hereinafter described and claimed, and that a full understanding may be had of the same, reference will be made to the accompanying drawing, in which—

Figures 1 and 2 are side and rear elevations respectively of a snow plow embodying my invention, and Fig. 3, is a bottom plan view of the same.

In the drawing the bottom of the plow as shown may be of a frame of generally V-shape and consisting of two members 1 and 2 mortised together at the front or pointed end of the plow. To the member 1 are joined a series of bows 3 having arms extending vertically above the member 1 to produce gradual increase from front to rear. From the upper ends of these vertical arms the bows turn downward at acute angles toward the member 2 of the frame to which the other ends of the bows are secured. These bows form a framework to which the plow blades are secured, one blade 5 thereof spanning the vertical arms of the bows and the other arms carrying the main sloping blade 6, the bottom margin of which is supported slightly lower than blade 5 so as to form a scraping edge. To the member 1 of the frame is also hinged at 7 the plow handle 8, which is also provided with a connection with member 2 in the form of an S-brace 9, bolted at one end to the handle at 10, and at its other end 11 pivoted to the plate 12 mounted on member 2. This pivot 11 is in line with the axis of the handle 7 so as to accommodate the swing of handle 8. To support the handle at the desired elevation, braces 13 and 14 are supplied, the former having a bolt and slot connection 15 with member 1, and the latter carrying a bolt 18, engaging with any one of the series of perforations 17 in a plate strip 16 attached to member 2.

In order that the plow may operate without undue friction, I have mounted a wheel 19 upon a stud 20 carried by member 1.

It will thus be seen that I have provided a snow plow which is extremely simple in design and of very few parts, easily operated and which may be readily adjusted to persons of different heights by merely shifting the bolt 18 to one of the other perforations 17.

While I have shown a device which constitutes one embodiment of my invention, I reserve the right to make such changes as may properly fall within the scope of the appended claims.

I claim:—

1. A snow plow, comprising a plow frame, a handle attached at its lower end by a hinge to one side of said frame, an adjustable brace connecting said handle to the other side of said frame, and an S-brace pivoted at one end to said handle and at its opposite end to said other side of the frame and in line with the axis of the hinge.

2. A snow plow, comprising a plow frame, a handle pivoted at its lower end to one side of said frame, an adjustable brace connecting said handle with said side of the frame and a brace attached to said handle and pivoted to the other side of said frame and in line with the axis of the handle.

In testimony whereof I affix my signature in presence of two witnesses.

WILLIAM H. JAMES.

Witnesses:
 H. C. RODGERS,
 GEO. Y. THORPE.

---

Copies of this patent may be obtained for five cents each, by addressing the "Commissioner of Patents, Washington, D. C."